United States Patent
Angiulo et al.

(12) 
(10) Patent No.: US 6,456,304 B1
(45) Date of Patent: Sep. 24, 2002

(54) PROCEDURAL TOOLBAR USER INTERFACE

(75) Inventors: Michael A. Angiulo, Redmond, WA (US); Nadim Abdo, Montreal (CA)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,417

(22) Filed: Jun. 30, 1999

(51) Int. Cl.[7] .................................................. G06F 3/00
(52) U.S. Cl. ...................... 345/779; 345/810; 345/843; 345/825
(58) Field of Search ................................. 345/762, 764, 345/779, 810, 853, 843, 835, 765, 840, 841, 825, 808

(56) References Cited

U.S. PATENT DOCUMENTS

| | | | | |
|---|---|---|---|---|
| 5,828,376 A | * | 10/1998 | Solimene et al. | 345/821 |
| 5,886,699 A | * | 3/1999 | Belfiore et al. | 345/843 |
| 6,100,885 A | * | 8/2000 | Donnelly et al. | 345/762 |
| 6,133,915 A | * | 10/2000 | Arcuri et al. | 345/779 |
| 6,177,941 B1 | * | 1/2001 | Haynes et al. | 345/810 |
| 6,199,046 B1 | * | 3/2001 | Heinzle et al. | 705/1 |

* cited by examiner

Primary Examiner—John Cabeca
Assistant Examiner—Kiev D Vu
(74) Attorney, Agent, or Firm—Ronald M. Anderson

(57) ABSTRACT

A user interface toolbar and associated method for enabling a user to make a series of selections in a procedural order that can be used to assign properties to a component object in an application program document. The toolbar contains a plurality of selection controls, each containing a control value and a dropdown menu. The menu options that drop down in successive selection controls change in context with the menu choices made in a previous selection control. A user typically fills selection controls from left to right (or top to bottom) in a procedural fashion. As the user makes selections to fill in the controls, the menus corresponding to the selection controls that are downstream (to the right of or below) the last filled selection control are updated based on the content of the previous selections. The toolbar allows a user to select and change any selection previously made, as desired, with the resultant changes effecting the selections and menus to the right of or below the changed selection. The toolbar also allows a user to enter a secondary set of control values in the selection controls. Properties may be assigned to a component object in an application program document based on the control values in the selection controls. The toolbar preferably is implemented as a modeless window comprising a title bar and a close window icon, wherein the plurality of selection controls are arranged horizontally across the toolbar, or vertically.

50 Claims, 6 Drawing Sheets

PROCEDURAL TOOLBAR USER INTERFACE

FIELD OF THE INVENTION

The present invention concerns user interfaces for computer application programs in general, and user interface toolbars in particular.

BACKGROUND OF THE INVENTION

There are many instances in which conventional menu structures are cumbersome for applying user-desired features to objects, especially when such features are defined through a series of procedural steps. In such cases, choices made in the menu structure will determine subsequent options from which the user may select. This problem is particularly troublesome when it is desirable to enable a user to modify any choice that was made in the series of choices (i.e., where it is desirable to provide "modeless options").

Most menu structures, such as dropdown menus, are static—that is, they correspond to a predefined command structure, where the options from which a user may choose do not change in response to a previous menu choice. These types of menus are often difficult to navigate through more than two levels, especially when a desired selection is embedded several layers down within the nested menu structure. Furthermore, menus of this sort do not readily support procedural selection processes, particularly where subsequent choices are context sensitive. The term "context sensitive" as used herein in connection with a series of options presented to a user means that the options presented to the user are dependent on a previous selection of one or more other options. This concept should not be confused with simply drilling down through a series of nested layers of menus to make a single choice from one of the options presented on a given layer. To make a series of procedural selections in which successive choices are context sensitive, the user should be able to choose one option from among a plurality of options, and as a result of that selection, the user should then be presented with a plurality of further options that are specific to the option selected. In some cases, the choice from the second set of options may lead to the user being provided yet a third set of options that relate only to the second choice. Currently, conventional menus cannot handle such procedural selections, since they do not have the ability to present context sensitive options that depend on previous choices, nor do they provide for reentry, i.e., they do not provide any means for a user to readily modify one of the choices in a series of linked selections.

Wizards provide an improvement over conventional menus for procedural selection of features, in that they typically are context sensitive to a user's prior selections. However, wizards have several drawbacks, including lack of reentry to previous steps, and modally locking the interface to prevent it from displaying additional selections.

Additional problems occur when it is desirable to attach multiple features to the same object. For instance, it would be desirable to apply simultaneous and/or sequential dynamic effects to objects on web pages. These effects may then be initiated in response to a variety of events, such as the loading of a page, a specific time interval lapsing, movement of the cursor to a predefined position, and other user interactions. The combination of the effects and the events would typically require multiple context sensitive wizards, each launching a series of modal dialog boxes for a particular effect. However, it would be advantageous to have an improved user interface that can enable a user to select and change features with less difficulty than existing interfaces and without reliance on the wizard paradigm.

SUMMARY OF THE INVENTION

The present invention addresses the foregoing menu and option selection problems by providing a user interface toolbar that comprises context sensitive controls. The toolbar enables the user to make a series of selections in a procedural order that assigns properties to a component object in an application program document. The toolbar contains a plurality of selection controls, each containing a dropdown menu. Note: the toolbar controls could be of any kind: one step might simply be a checkbox or a latched button. The menu options that drop down in successive selection controls change in context based on the selected component object, the menu choices made in a previous selection control, and optionally, in consideration of user selectable compatibility settings. A user typically fills selection controls (i.e., makes control choices) from left to right or top to bottom, in a procedural fashion. But if necessary the toolbar can use the enabled/disabled state of the control to force the user to the next logical step. As the user makes selections to fill in the controls, the menus corresponding to the selection controls that are downstream (to the right of or below) the last filled selection control are updated based on the content of the previous selections. The toolbar allows a user to select and change any selection previously made, as desired, with the resultant changes affecting the selections and menus to the right of or below the changed selection control.

According to a first aspect of the invention, a method for assigning properties to a component object in an application program is provided, wherein the application program runs on a computer system having a graphical user interface, and including a display and a user interface selection device. A user of the application program positions the user interface selection device to select a component object, such as a text object or a graphic object that is to have properties assigned to it. The properties are assigned according to control values that are entered into a toolbar that comprises a plurality of selection controls, wherein each selection control has a control value and an associated dropdown menu. The toolbar preferably comprises two or three selection controls, but may comprise more selection controls. The selection controls preferably are arranged in a horizontal fashion along the toolbar, so that a user enters control value selections procedurally in a left-to-right fashion. Optionally, the controls may be arranged vertically, wherein the user enters control value selections in a top-to-bottom order. Control values are entered into the selection controls by selecting a menu item from each selection control dropdown menu in a procedural fashion, starting with the first (preferably leftmost or top) selection control. The menu of a given selection control depends on the value of the selection control that is to its immediate left, so that the menus are nested on a context sensitive basis. The menu items for the first selection control dropdown menu preferably depend on a context of the selected component object. The menu items for the second selection control dropdown menu are context sensitive to the control value selected from the first selection control dropdown menu, in light of the context of the selected component object. Likewise, in the event a third selection control is used, the menu items for the third selection control dropdown menu are context sensitive to the control value selected from the second selection control dropdown menu. Various properties are assigned to the selected component object based on the control values entered in the selection controls.

Another aspect of the present invention is the toolbar's ability to support re-entrant selection of control values, wherein changes to a previously selected control value cause the control values in downstream selection controls (to the right or below) to be cleared. Whether a downstream control value is cleared depends on whether the previously selected and new control values share a common context. The user may selectively change a control value for any of the controls. In some instances, changes to the first selection control cause the control values in the second and third selection controls to be cleared. In other instances, changes to the second selection control value cause the control value in the third selection control to be cleared. A change to a given selection control does not cause a change to any selection control that is upstream of it (to the left of it or above it). When a selection control is changed, the menu in the selection control to the immediate right of or below the changed control is updated, as necessary, to reflect a context of the new control value.

According to another aspect of the invention, the method provides for assigning additional properties to the component object by enabling the user to enter secondary control values in the selection controls. This procedure begins by enabling the user to select a secondary control value for the first selection control. The dropdown menu for the first selection control preferably contains indicia indicating that a previous menu item has already been assigned to the component object. Upon selection of the secondary control value (i.e., the selection of any menu item that is different from the existing selection), the second and third (if applicable) selection controls are cleared, and the user proceeds to enter secondary selections into these selection controls in a fashion similar to that described above for procedurally entering control values.

According to yet another aspect of the invention, the toolbar is designed to prompt the user to procedurally enter information. For instance, the toolbar preferably is disabled if no component object is selected, or if the selected component object cannot have properties assigned to it. Once a proper component object is selected, the toolbar is preferably displayed in an active mode, wherein the first selection control contains a prompt requesting a user to select a menu item from its dropdown menu if the selected component object has yet to have any properties assigned to it. Similarly, once a first selection control value is entered, the second selection control contains a prompt requesting the user to select a menu item from the second selection control dropdown menu. Similar prompting is preferably added to the third selection control, once a value has been selected for the second selection control. Selection of a component object with previously-assigned properties will cause the toolbar to display selection control values corresponding to the properties assigned to that object, the values of which may be edited in a similar fashion to that describe above.

The toolbar preferably includes additional controls, including a button for clearing the control values for the current component object. Clicking on a clear button causes the control values in each of the selections to be cleared, and if the component object has had properties assigned to it based on these control values, the assigned properties are also cleared from the component object. The toolbar also preferably includes a "highlight selected component object" toggle button that toggles a visual highlighting of the selected component object and/or a visual highlighting of all component objects in a document that have been assigned properties. When the component object is selected, the properties assigned to the object are displayed if the user positions a cursor over it with the user interface input device. The toolbar optionally includes a tip box associated with each of its controls, whereby the tip box in visually displayed when the cursor is positioned over the control, to indicate to the user the purpose of the control.

In a preferred embodiment, the invention is implemented in an application program suitable for designing web page documents that include component objects having dynamic hypertext markup language (DHTML) effects assigned to them. Coming soon will be a new technology (probably to be accepted as an internet standard) called "Behaviors" or DHTML+TIME. For all intents and purposes it is the same as DHTML today except instead of using a scripting language it is all tag based. For example, a graphic component object may be assigned a dynamical HTML effect so that it "flies in" from a predetermined direction when the document is loaded for display on a user's browser. The first selection control menu contains a list of events that may be selected to trigger a dynamic HTML effect. The second selection control menu contains a list of dynamic effects that can be selectively applied to the component object, while the third selection control menu contains a list of settings that are applicable to the selected dynamic effect, as appropriate. Preferably, all of the event, effect, and settings menus take into consideration compatibility settings related to the browsers with which the display page (and its dynamic HTML effects) are compatible. The toolbar and method allow a user to assign multiple dynamic HTML effects to the same component object.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
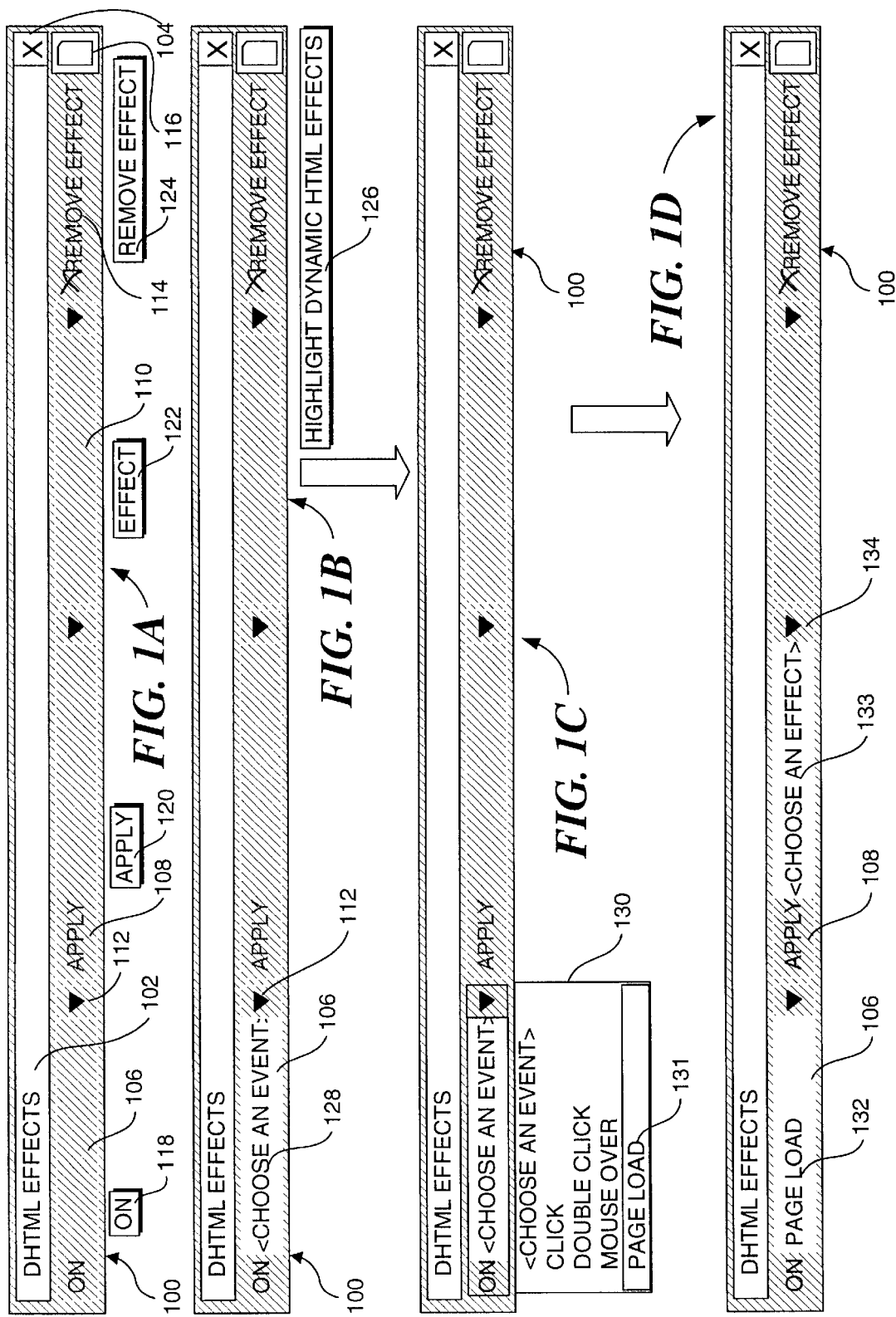
FIG. 1A shows the user interface toolbar of the present invention in a disabled mode.
FIG. 1B shows the toolbar in its initial configuration.
FIG. 1C shows the toolbar displaying a first selection control menu.
FIG. 1D shows a configuration of the toolbar after an entry has been made to its first selection control.

The present invention comprises a procedural toolbar that enhances the user interface of an application program. In order to enable the reader to more easily understand the functionality and operation of the present invention, the following text describes an exemplary procedural toolbar, shown in FIGS. 1A–1D, 2A–2D, 3A–3D, and 4A–4D, which is used in Microsoft Corporation's FRONTPAGE 2000™ web page publishing program. This example and its specific application to web page design and editing is not intended to limit the scope of the present invention, as the procedural toolbar can be used in many other types of application programs.

The FRONTPAGE 2000™ web page publishing program supports many web page and web site functional features, simplifies the design of web pages, and allows a user to create a web page (displayable on a web browser) that includes a plurality of graphic and text component objects, such as a bitmaps, photos, and text. The exemplary procedural toolbar described herein is used for selecting dynamic HTML (DHTML) effects that are assigned to various component objects on the web page. A DHTML effect is used to provide a displayed interaction or effect to a component object with which it is associated, such as making a text block "fly in" from the top of a page. The dynamic effect is generally invoked in response to a predetermined event, such as the loading of the web page into a user's browser for viewing, or the positioning of a cursor over an object on the displayed page.

In order to assign an effect to a component object, it is necessary to define the effect through the use of a procedural series of menu selections. The menu selections are accessed through a plurality of selection controls that are displayed on the procedural toolbar, wherein each selection control is associated with a dropdown menu and displays a plurality of options. The selection controls are preferably arranged from left to right, but may alternatively be listed from top to bottom. It will be understood that in the following discussion, references made to the controls as being displayed from left to right are also intended to apply to controls that are displayed vertically and are initially completed from top to bottom.

Displayed in the initial (left-most) menu level is a list of events from which the user may select a DHTML effect that is to be included on the web page. At this first level, the user chooses a dynamic effect that will be associated with an object and which will be displayed or activated upon occurrence of a selected event. At the second level, the user chooses the effect settings, to determine which of the criteria applicable to the selected effect will be applied.

The various menus selections are context based and are not static—that is, the menus displayed to the user to enable a selection to be made are contextually based on the user's selection of an option from the directly preceding menu. The initial or top level event selection menu may be static, (e.g., always displaying the same options), or may be based on the context of the selected object to which the event will apply. Thus, certain events may only be applicable to specific types of objects, in which case it is appropriate to only display events that can be applied to the object that was selected by the user before the toolbar was activated. The following explanation and specific examples should make the preceding discussion clear.

Figure 4:
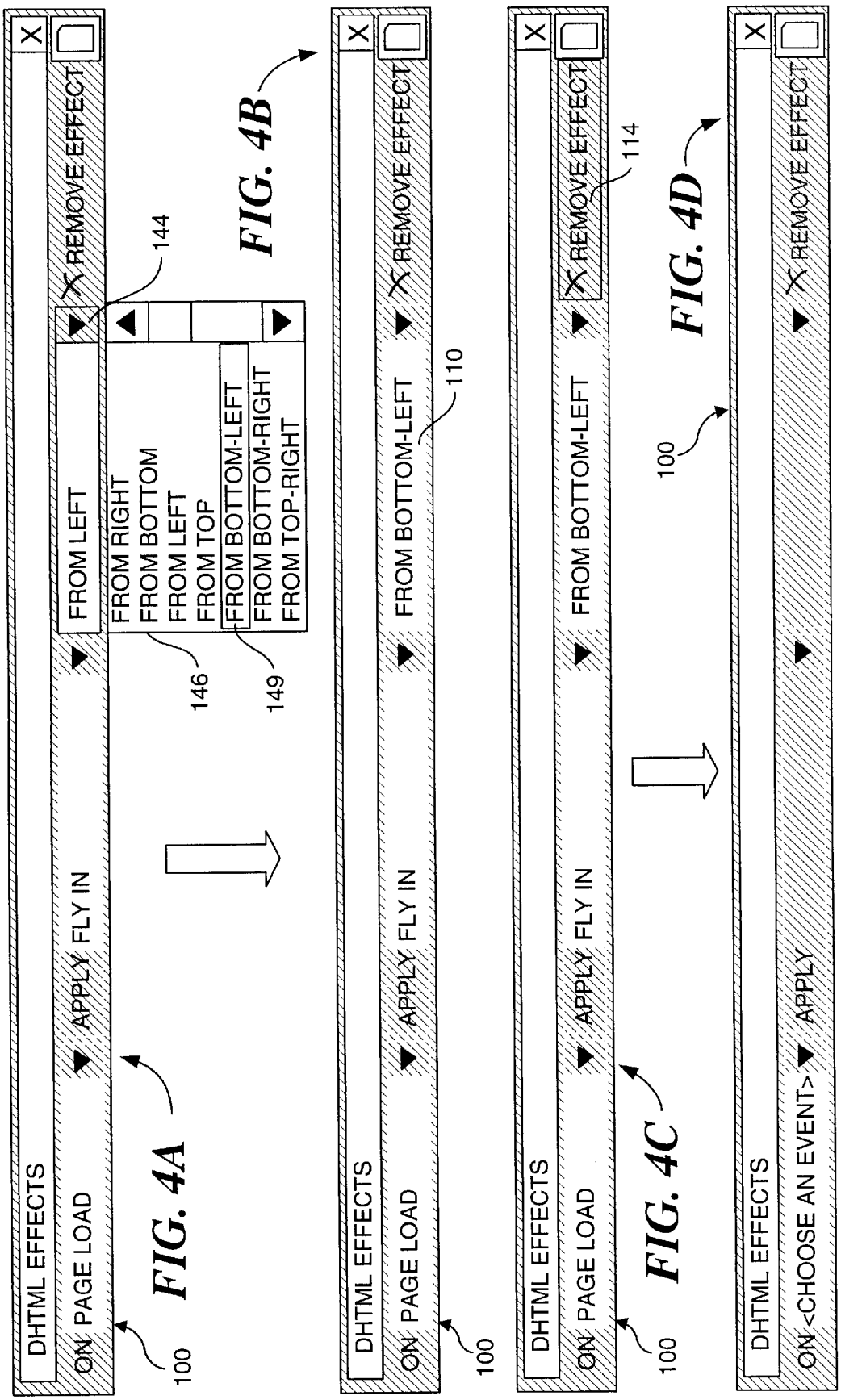
FIG. 4A shows the toolbar displaying the third selection control menu during a reentry of the third selection control value.
FIG. 4B shows the toolbar after a reentry of the third selection control value.
FIG. 4C shows the toolbar's clear button being activated.
FIG. 4D shows the toolbar reverting back to its initialized configuration after the clear button has been activated.
Figure 5:
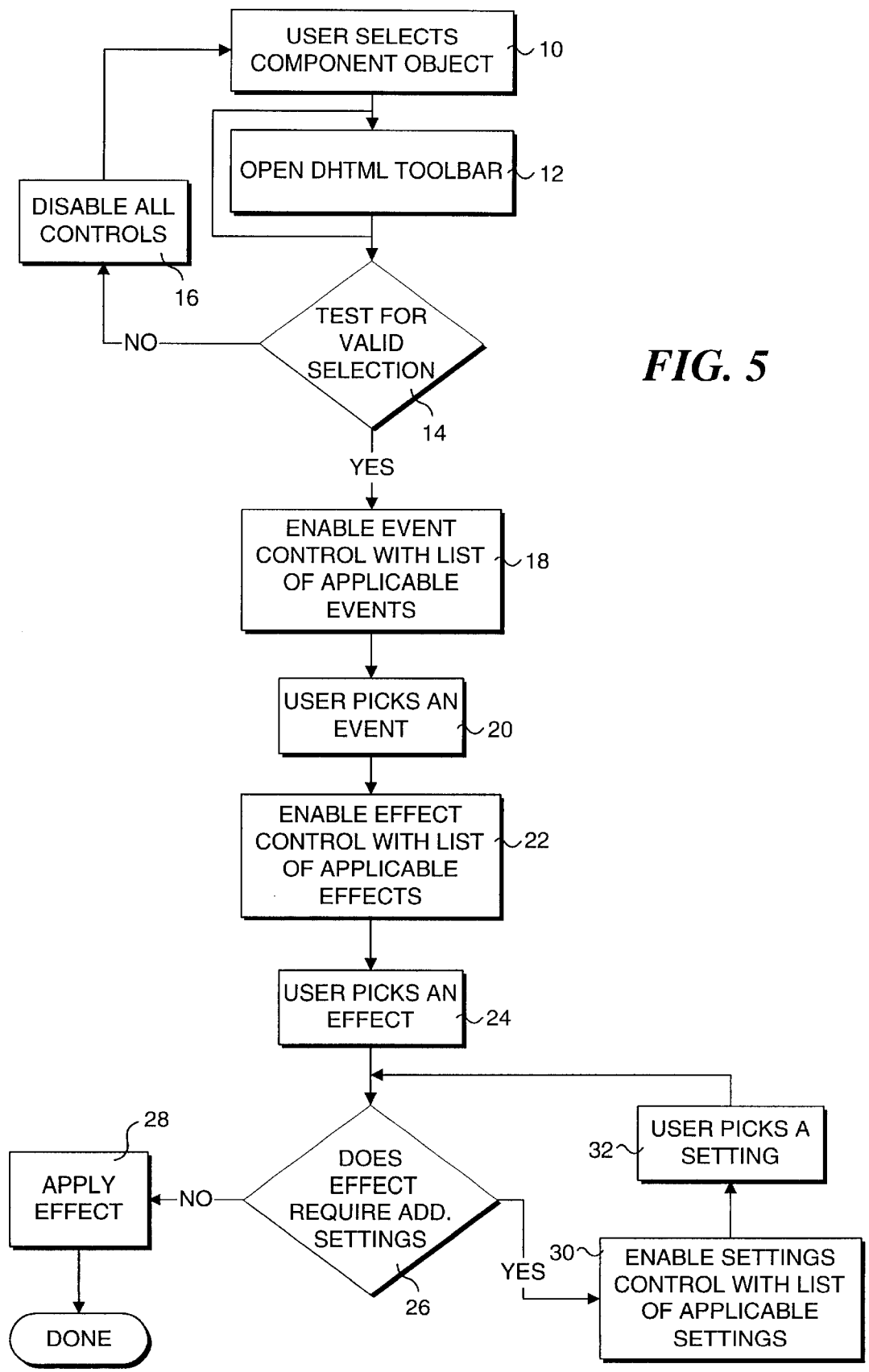
FIG. 5 is a logic flow diagram for illustrating the process that is used when applying a dynamic HTML effect to a display page component object.

As shown in FIG. 5, the process for assigning a DHTML effect to a component object begins in a block 10, where a user selects a component object, such as a text string or graphic, which is displayed on the web page being designed. The user then opens a DHTML effect toolbar 100 (FIGS. 1A–1D, 2A–2D, 3A–3D, and 4A–4D) in a block 12 by selecting the corresponding menu item from the FRONTPAGE 2000™ edit menu. Alternately, the toolbar may selectively be automatically displayed upon start-up of FRONTPAGE 2000™, or it may selectively be displayed when a new or existing document is opened.

Referring to FIG. 1A, DHTML effect toolbar 100 is a modeless window that can be moved by clicking and dragging a title bar 102 or other parts of the tool bar background. The DHTML effect toolbar can be closed by clicking on a close window icon 104, or by typing alt-F4 on the user's keyboard (not shown). DHTML effect toolbar 100 comprises three selection controls, including an event selection control 106, an effect selection control 108, and an effect settings selection control 110. Each selection control is associated with a dropdown menu, which may be activated by clicking on the selection control's corresponding dropdown menu activation button. For example, clicking on an effect dropdown menu activation button 112 activates a dropdown menu for event selection control 106. The DHTML effect toolbar additionally comprises a "remove effect" button 114, and a "highlight DHTML effects" toggle button 116. Note that the hatched areas of the toolbar represent portions that preferably are displayed in the conventional gray color normally associated with Microsoft's WINDOWS™ graphic user operating system buttons and controls. In addition, grayed text, such as the "REMOVE EFFECT" text shown in FIG. 1A, indicates that a control is disabled.

The DHTML effect toolbar may optionally display context sensitive tip boxes when the user positions a mouse (or other pointing device controlled) cursor over a selection control or button anytime the DHTML effect toolbar is displayed, both in its disabled and active modes (discussed below). For instance, positioning and holding the cursor over event selection control 106 will cause an "ON" tip box 118 to be displayed. There are similar tip boxes associated with each respective control or button, including an "APPLY" tip box 120 associated with effect selection control 108, an "EFFECT" tip box 122 associated with effect settings selection control 110, a "REMOVE EFFECT" tip box 124 associated with "remove effect" button 114, and a "HIGHLIGHT DHTML EFFECTS" tip box 126 associated with "highlight DHTML effects" toggle button 116 (shown in FIG. 1B).

Continuing with the process, in a decision block 14, a determination verifies whether the selected component object can have DHTML effects assigned to it. For example, in the event that DHTML effect toolbar 100 is initially displayed, a component object may not yet be selected, or the component object that is selected may not support the assignment of any DHTML effects. In either of these cases, in a block 16, all of the text corresponding to the selection controls and the "remove effect" button are grayed and disabled, indicating that selection of the controls or button will have no effect, and the system produces no further action until an appropriate component object is selected in block 10.

Once an appropriate component object is selected, a block 18 displays DHTML effect toolbar 100 in an active mode, in the toolbar's initial configuration, as shown in FIG. 1B. The toolbar is displayed in its active mode whenever a user selects an object on the web page that can have (or already does have) DHTML effects assigned to it. The toolbar is displayed in its initial configuration, as illustrated in this Figure, when the selected component object does not have any DHTML effects yet assigned to it.

In its initial configuration, DHTML effect toolbar 100 displays "<choose an event>" text 128 in event selection control 106. This text prompts the user to select event dropdown menu activation button 112, which causes an event dropdown menu 130 to be displayed, as shown in FIG. 1C. Event dropdown menu 130 contains a list of events that can be selected to cause one or more DHTML effects to be assigned to the web page object. As the user moves the cursor over the dropdown menu items, the menu items are highlighted, one at a time. In a block 20 (FIG. 5), the user may select a desired event by clicking on a highlighted menu item, such as a "PAGE LOAD" menu item 131, which is then saved as an event selection control value 132, as shown in FIG. 1B.

The menu items in event dropdown menu 130 comprise a list of trigger events that may be assigned to the selected component object. For instance, some component objects may support certain types of triggering events, while not supporting others. The list of events also depends on user selected browser compatibility settings in FRONTPAGE 2000™ that identify various browsers with which the user desires the web page to be compatible. For example, while NETSCAPE NAVIGATOR 4.0™ and MICROSOFT INTERNET EXPLORER 4.0™ support many DHTML effects and their associated triggering events, some earlier versions of these and other current versions of other browsers may not support all such effects and/or events. If the compatibility settings are set to support these earlier browsers, then the list of possible events that may be used to trigger a DHTML effect is limited to the events supported by the selected browsers with which the display page is to be compatible.

Figure 2:
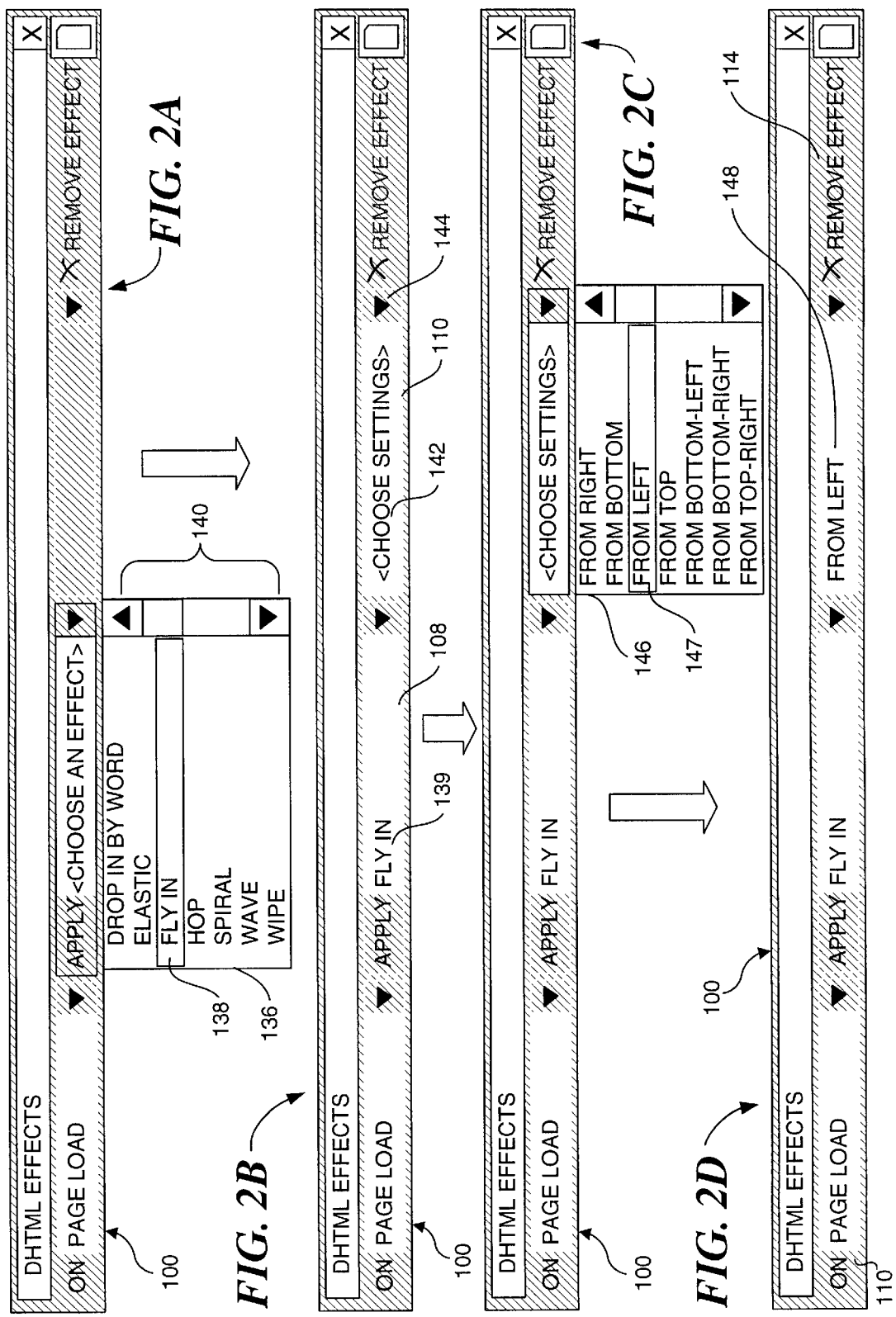
FIG. 2A shows the toolbar displaying a second selection control menu.
FIG. 2B shows a configuration of the toolbar after an entry has been made to its second selection control.
FIG. 2C shows the toolbar displaying a third selection control menu.
FIG. 2D shows a toolbar that has all of its selection control values entered.

Next, in accord with a block 22 (FIG. 5), effect selection control 108 will be changed to prompt the user to select an effect by displaying a "<CHOOSE AN EFFECT>" text prompt 133, as shown in FIG. 1D. The user will then click on an effect dropdown menu activation button 134 with the mouse or other pointing device, which will cause an effect dropdown menu 136 to be displayed (as shown in FIG. 2A). The effect dropdown menu items are context sensitive for the event selected—that is, the menu items listed in a given effect menu will depend on what event has been selected by the user. For instance, effect dropdown menu 136 contains a list of effects that may be invoked whenever the web page is loaded (as a result of the user previously selecting the event "PAGE LOAD"). Similarly, other dropdown menus of effects (not shown) may be displayed, containing menu selections for effects associated with other events, such as the "CLICK," "DOUBLE CLICK," and "MOUSE OVER" events shown in dropdown menu 130. As with the event dropdown menu, the effect menu items will also depend on the compatibility settings.

Upon display of the menu, in a block 24 (FIG. 5), the user selects a highlighted menu item such as a "FLY IN" menu item 138 from dropdown menu 136 to set the effect that will be applied in the effect selection control 108, as shown in FIG. 2B. Longer menus may include a scroll bar 140, as shown in FIG. 2A, to enable a user to access all of the available options. The selected event is saved as event selection control value 139.

Figure 3:
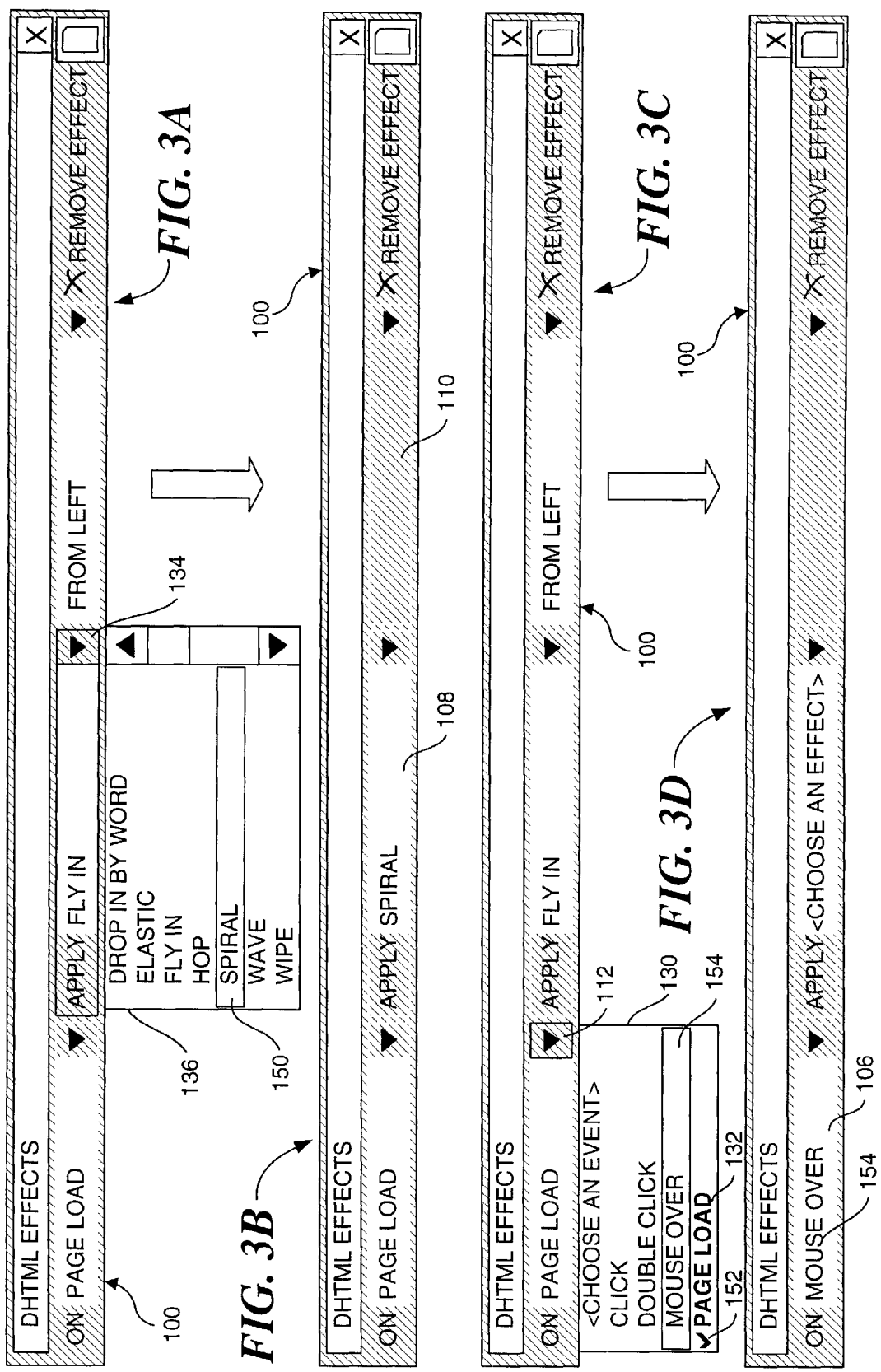
FIG. 3A shows the toolbar displaying the second selection control menu during a reentry of the second selection control value.
FIG. 3B shows the toolbar when an entry for its third selection control is not required.
FIG. 3C shows the toolbar displaying the first selection control menu to indicate that a previous control value has been assigned to a selected component object in a document.
FIG. 3D shows the toolbar after a secondary control value has been entered in the first selection control.

Depending on the effect that is selected, the user may be required to enter additional settings corresponding to the selected effect. For example, some of the available effects may require additional settings be chosen, such as a direction from where an animation is to initiate, while other effects may not. A decision block 26 (FIG. 5) determines whether additional settings are needed. In the event that an effect is chosen that does not require additional settings, the effect settings selection control 110 remains blank and disabled (grayed out). Such a case is shown in FIG. 3B, where the "SPIRAL" effect does not require additional settings. The DHTML effect selection process is then complete, and a DHTML effect is assigned to the component object in a block 28 (FIG. 5) based on the selected event and selected effect control values.

If additional settings are required, a block 30 (in FIG. 5) prompts the user to make further choices by displaying a "<CHOOSE SETTINGS>" text prompt 142 that is displayed in effect settings selection control 110 (FIG. 2B), and a settings selection dropdown menu 146 is loaded with a list of applicable settings based on the selected event and effect, along with the selected component object and compatibility settings, as shown in FIG. 2C.

Referring back to FIG. 5, in a block 32, the user then selects a dropdown menu activation button 144 (FIG. 2B), causing the effect settings dropdown menu 146 to be displayed, as shown in FIG. 2C. As with the above menus, the user selects a highlighted item such as a "FROM LEFT" menu item 147 by clicking on it (or pressing the "Enter" button on the keyboard while menu item 147 is highlighted), causing the selected item to be displayed as a control value 148 in effect settings selection control 110 (FIG. 2D).

The logic then flows back to decision block 26 in FIG. 5, where the query to determine whether any additional settings are required is repeated. The process of adding additional settings is repeated until no additional settings are required. At this point, the DHTML effect selection process is complete for this example, and the selected effect (with associated event and settings) is assigned to the web page component object that the user selected before starting this process. Note that once a complete effect has been applied to a component object, remove effect button 114 is enabled, as shown in FIG. 2D.

The procedural toolbar provides further functionality by enabling the user to change previously selected control values. As shown in FIG. 4A, the user may change the effect setting control value by simply clicking on effect setting dropdown menu activation button 144 and choosing a new setting, such as a "FROM BOTTOM-LEFT" menu item 149. The newly chosen effect setting is then displayed in effect settings selection control 110, as shown in FIG. 4B.

Changes can be made to the control values displayed in the effect selection control and the event selection control in a similar fashion. However, changes to previously selected control options may cause changes in the options previously selected for controls downstream (to the right) and their associated control selections, depending on the context of the new and prior selections. For example, suppose the user decides to change the effect from the previous selection, "FLY IN," to the "SPIRAL" effect. This change is accomplished by clicking on effect dropdown menu activation button 134, which redisplays effect dropdown menu 136. From effect dropdown menu 136, the user selects a "SPIRAL" menu item 150. As a result, the effect assigned to the web page object (and displayed as the control value in effect selection control 108) is changed to the "SPIRAL" effect, as shown in FIG. 3B. Because the "SPIRAL" effect does not required a control option to be set in effect settings selection control 110, it no longer displays any option in FIG. 3B.

There are some instances where the downstream controls (the controls to the right of the active control) may not change in response to a change made upstream. For instance, multiple effects may have a common setting, such as "WIPE" and "FLY IN." Thus, when a user changes an effect, but the new effect supports the setting already displayed in the effect settings selection control, the effect setting option in effect settings selection control 110 is not changed. This situation may also apply to a change in the selected event. For instance, it is likely that the mouse events "CLICK" and "DOUBLE CLICK" will support common effects. Thus, changing the selected event will not cause the downstream selections to change if the previously selected effect is supported by both the previous and newly selected events.

Another substantial benefit of the procedural toolbar is its ability to support selection of multiple events. For example, the user may want to apply a DHTML effect to a given object whenever the web page is loaded and whenever a user moves a cursor over the object after it is loaded. To add another HTML effect to the component object, the user first clicks on effect dropdown menu button activation 112 to display event dropdown menu 130, as shown in FIG. 3C. Depending on the context of previously selected events, the event dropdown menu may contain indicia identifying the existence of one or more events already assigned to the web page object. For example, if the "PAGE LOAD" event has already been assigned (from the steps above), "PAGE LOAD" menu item 132 may be displayed in bold font or contain a check mark or other mark to indicate that the PAGE LOAD event has already been associated with the object. Conversely, there may be instances where it is preferable to replace an existing event assignment, rather than add a new event assignment. For example, the user may desire to replace the "CLICK" event with a "DOUBLE CLICK" event. If two events are mutually exclusive, they cannot both be associated with an object, and thus, the user will be required to decide whether to replace the event already selected with the other, mutually exclusive event. The determination of whether to add or replace event assignments may be appropriately made by an application program developer based on the context of the application programs menu items.

Upon selecting an additional event (or a replacement event, as applicable), the selected event will be displayed in the event selection control. For example, the user has selected a "MOUSE OVER" event menu item 154, as shown in FIGS. 3C–3D. In response to this choice, the downstream controls no longer display the options previously chosen for the former event, but instead are changed to display appropriate content based on the context of the newly selected event. The user then repeats the process discussed above for selecting an effect and the contextually appropriate settings for the newly chosen effect.

The user may also remove an assigned effect (or clear an effect that is being entered) by clicking on "remove effect" button 114, as shown in FIG. 4C. When the "remove effect" button is activated, the configuration of the toolbar reverts to its initial configuration, as shown in FIGS. 4D and 1B. Clicking on "highlight DHTML effects" button 116 (see FIG. 1A) toggles highlighting of the web page component objects that have DHTML effect assigned to them. This highlighting enables a user to easily identify the component objects on a page that do and do not have assigned DHTML effects. Furthermore, when a web page component object is highlighted, moving the cursor over the object will cause a display box to dynamically appear. This display box (not shown) will contain information regarding the dynamic effect(s) assigned to the object. For example, a component object that is assigned a fly in effect, from the left, to occur when its web page is loaded, would have a display box that includes the text "DHTML EFFECT: ON PAGE LOAD, FLY IN FROM LEFT." In cases where multiple event effects are assigned to the component object, the display box will display entries corresponding to each assigned event effect.

The ordering and menu structure of the procedural toolbar may be modified from that described above so as to best fit a particular application program. For example, the DHTML effect toolbar described above provides for the entry of contextual information via selection controls in a left-to-right fashion. This arrangement corresponds to how most Western Civilizations interpret display text, i.e., most languages are written and read from left to right. However, some languages are written and read from right to left. A procedural toolbar in accord with the present invention may be designed so that the contextual information for each successive choice is contained in selection controls that are arranged and actuated from right to left. In addition, there may be additional controls and associated menus, depending upon the nature of the object, event, effect, or other parameters implemented by a tool bar in accord with the present invention.

In the foregoing description, more than one event could be selected to be applied to a web page object. In a similar fashion, a menu structure could be set up so that more than one item in a menu could be selected. For instance, a formatting sub-menu could list various formatting feature selections that could be simultaneously applied, such as selections for making a text font display as both "bold" and in "red." Optionally, one of the dropdown menus can list a formatting-related menu option that would invoke (when selected) a conventional formatting dialog, allowing a user to select various formatting options, such as text fonts, borders, etc. The use of multiple selections could apply to a menu list associated with any selection control. The menus may also be sectioned to allow for only a single selection among each menu section Exemplary Operating Environment FIG. 6 and the following discussion are intended to provide a brief, general description of a suitable computing environment in which the invention may be implemented. Although not required, the invention will be described in the general context of computer executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 6:
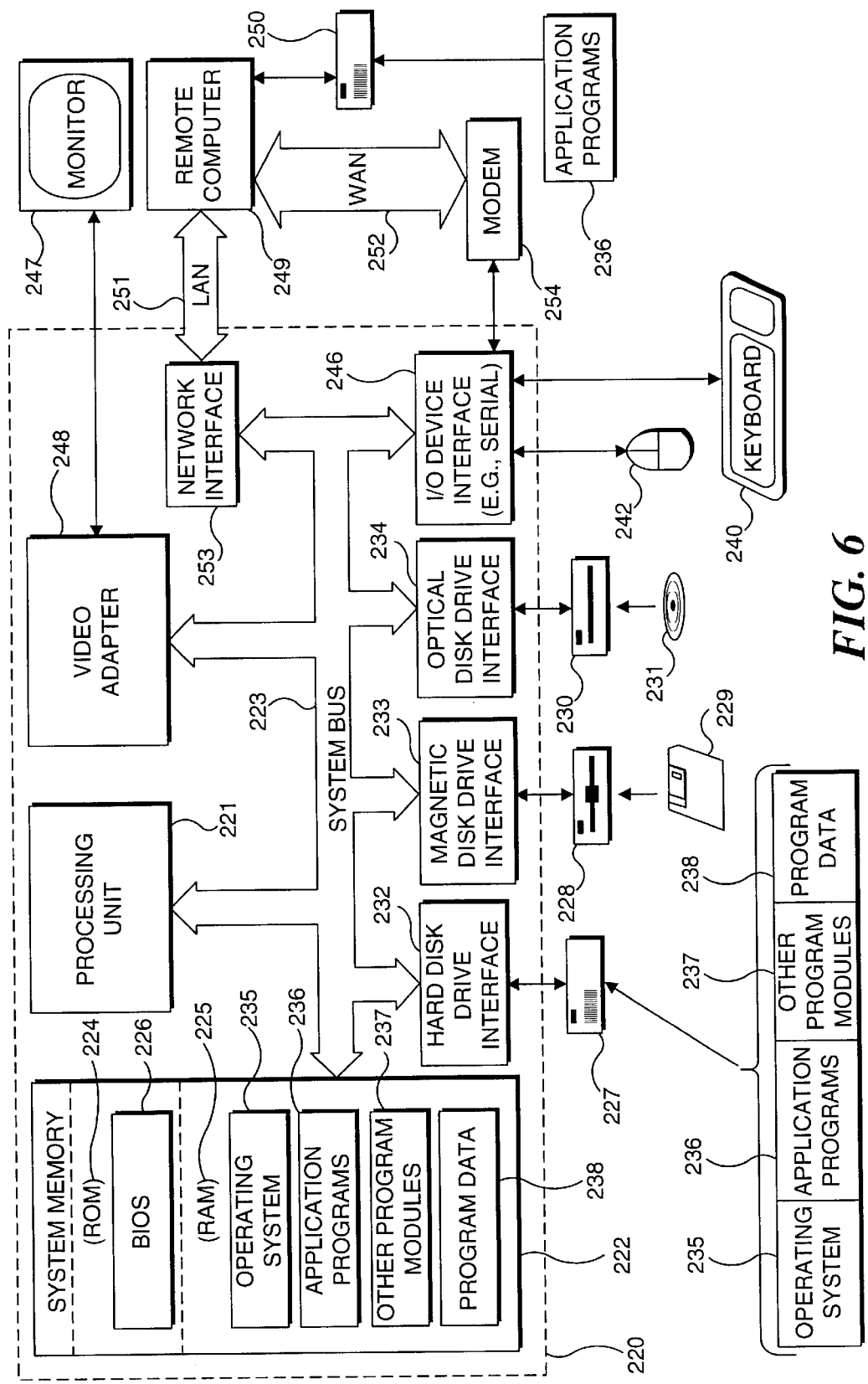
FIG. 6 illustrates an exemplary environment for practicing the invention.

With reference to FIG. 6, an exemplary system for implementing the invention includes a general purpose computing device in the form of a conventional personal computer 220, including a processing unit 221, a system memory 222, and a system bus 223 that couples various system components including the system memory to processing unit 221. System bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that helps to transfer information between elements within personal computer 220, such as during start-up, is stored in ROM 224. Personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231 such as a CD-ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. The drives and their associated computer readable media provide non-volatile storage of computer readable instructions, data structures, program modules, and other data for personal computer 220. Although the exemplary environment described herein employs a hard disk, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAM, ROM, and the like, may also be used in the exemplary operating environment.

A number of program modules may be stored on the hard disk, magnetic disk 229, optical disk 231, ROM 224, or RAM 225, including an operating system 235, one or more application programs 236, other program modules 237, and program data 238. A user may enter commands and information into personal computer 220 through input devices such as a keyboard 240 and a pointing device 242. Other input devices (not shown) may include a microphone, joystick, game pad, satellite dish, scanner, or the like. These and other input devices are often connected to processing unit 221 through a serial port interface 246 that is coupled to the system bus, but may be connected by other interfaces, such as a parallel port, game port, or a universal serial bus (USB). A monitor 247 or other type of display device is also connected to system bus 223 via an interface, such as a video adapter 248. In addition to the monitor, personal computers typically include other peripheral output devices (not shown), such as speakers and printers.

Personal computer 220 may operate in a networked environment using logical connections to one or more remote computers, such as a remote computer 249. Remote computer 249 may be another personal computer, a server, a router, a network PC, a peer device or other common network node, and typically includes many or all of the elements described above relative to personal computer 220, although only a memory storage device 250 has been illustrated in FIG. 6. The logical connections depicted in FIG. 6 include a local area network (LAN) 251 and a wide area network (WAN) 252. Such networking environments are commonplace in offices, enterprise-wide computer networks, Intranets, and the Internet.

When used in a LAN networking environment, personal computer 220 is connected to local network 251 through a network interface or adapter 253. When used in a WAN networking environment, personal computer 220 typically includes a modem 254 or other means for establishing communications over WAN 252, such as the Internet. Modem 254, which may be internal or external, is connected to system bus 223 via serial port interface 246. In a networked environment, program modules depicted relative to personal computer 220, or portions thereof, may be stored in the remote memory storage device. It will be appreciated that the network connections shown are exemplary and other means of establishing a communications link between the computers may be used.

Although the present invention has been described in connection with one or more preferred forms of practicing it, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

the invention in which an exclusive right is claimed is defined by the following:

1. In a computer system having a graphical user interface and including a display and a user interface selection device, a method for enabling a user to assign properties to a component object in an application program document, comprising the steps of:

(a) enabling a user to select the component object on the display;

(b) displaying a toolbar comprising a plurality of selection controls, each selection control having a control value and an associated dropdown menu comprising a set of menu items;

(c) enabling a user to enter a control value for a first selection control by selecting a menu item from among the set of menu items comprising the dropdown menu for the first selection control, the set of menu items being based on a context of the selected component object;

(d) enabling a user to enter a control value for a second selection control, disposed adjacent to the first selection control, by selecting a menu item from among the set of menu items comprising the dropdown menu for the second selection control, the set of menu items being based on a context of the control value in the first selection control; and (e) assigning the properties to the selected component object based on the control values entered in the plurality of selection controls by a user.

2. The method of claim 1, wherein the toolbar is disabled when no component object in the application program document is selected.

3. The method of claim 1, wherein the toolbar has an initial configuration in which the control values in the selection controls are cleared.

4. The method of claim 1, wherein the toolbar further includes a clear button, the clear button causing the control values in the plurality of selection controls to be cleared when activated by a user.

5. The method of claim 4, wherein the selected component object has properties that have been previously assigned to it, and further wherein activation of the clear button causes any previously assigned properties corresponding to the control values that are cleared from the plurality of selection controls to be removed from the selected component object.

6. The method of claim 1, wherein the toolbar is a moveable modeless window disposed on the display.

7. The method of claim 1, wherein selection by a user of a component object that has not been assigned any properties causes the first selection control to display a prompt requesting a user to select a menu item from the dropdown menu for the first selection control.

8. The method of claim 1, wherein the second selection control displays a prompt requesting a user to select a menu item from the dropdown menu for the second selection control upon entry of a control value into the first selection control.

9. The method of claim 1, wherein the toolbar further includes a control enabling a user to visually highlight the selected component object, and wherein the properties assigned to a highlighted selected component object are displayed when a user positions a cursor over the selected component object.

10. The method of claim 1, wherein the toolbar further includes a control enabling a user to visually highlight all component objects in the application document that have properties assigned to them.

11. The method of claim 1, wherein a dropdown menu of a control contains a menu item that causes a dialog corresponding to the formatting context to be invoked upon selection of said menu item, whereby the dialog that is invoked enables the user to select formatting properties to be applied to the selected component object.

12. The method of claim 1, further comprising the step of enabling a user to re-enter a new control value for the first selection control by selecting a menu item from among the set of menu items comprising the dropdown menu for the first selection control that is different than an existing control value previously selected for the first selection control, selection of the new control value causing the control value in the second selection control to be cleared if the latter control value is not a viable option for a context of the selected component object and the new control value.

13. The method of claim 12, wherein the set of menu items for the second selection control are updated based on the new control value for the first selection control.

14. The method of claim 1, further comprising the step of enabling a user to assign secondary properties to the selected component object by:
 (a) enabling a user to enter a secondary control value for the first selection control by selecting a previously unselected menu item from among the set of menu items comprising the dropdown menu for the first selection control;
 (b) enabling a user to enter a secondary control value for the second selection control by selecting a menu item with the user interface selection device from among the set of menu items comprising the dropdown menu for the second selection control, the set of menu items being based on a context of the additional control value in the first selection control; and
 (c) assigning the secondary properties to the selected component object based on the secondary control values entered in the plurality of selection controls.

15. The method of claim 14, wherein the dropdown menu of the first selection control contains indicia indicating that a previous menu item selection has been assigned to the component object.

16. The method of claim 1, further comprising the step of enabling a user to enter a control value for a third selection control, disposed adjacent to the second selection control, by selecting a menu item from among the set of menu items comprising the dropdown menu for the third selection control, the set of menu items being based on a context of the control value in the second selection control.

17. The method of claim 16, further comprising the step of enabling a user to enter a new control value for the second selection control by selecting a menu item from among the set of menu items comprising the dropdown menu for the second selection control that is different than an existing control value previously entered, selection of the new control value causing the control value in the third selection control to be cleared.

18. The method of claim 17, further wherein the set of menu items for the third selection control are updated based on the new control value for the second selection control.

19. The method of claim 16, wherein the third selection control displays a prompt requesting a user to select a menu item from the dropdown menu for the third selection control following entry of a control value into the second selection control.

20. The method of claim 16, further comprising the step of enabling a user to enter a new control value for the first selection control by selecting a menu item from among the set of menu items comprising the dropdown menu for the first selection control that is different than the existing control value, selection of the new control value causing the control values in the second selection control and the third selection control to be cleared.

21. The method of claim 16, wherein the first selection control dropdown menu comprises a set of event menu items.

22. The method of claim 21, wherein the second selection control dropdown menu comprises a set of effect menu items.

23. The method of claim 22, wherein the set of menu items comprising at least one of the dropdown menu for the second selection control and the dropdown menu for the second selection control are based in part on browser compatibility criteria.

24. A computer readable medium having computer executable instructions for performing the steps of the method of claim 1.

25. A computer readable medium having computer executable instructions for performing the steps of the method of claim 16.

26. A toolbar usable in an application program running on a computer system having a graphical user interface, for, assigning properties to a selected component object in the application program, the toolbar comprising:
 (a) a moveable modeless window having a title bar and a close icon;
 (b) a first selection control having a control value and an associated dropdown menu comprising a set of menu items that are based on a context of the selected component object; and
 (c) a second selection control disposed adjacent to the first selection control and having a control value and an associated dropdown menu comprising a set of menu items that are based on a context of the control value in the first selection control.

27. The toolbar of claim 26, wherein entry of control values in the first and the second selection controls of the toolbar is disabled if no component object in the application program document is selected.

28. The toolbar of claim 26, wherein the toolbar has an initial configuration in which the control values in the selection controls are cleared.

29. The toolbar of claim 26, further comprising a clear button, activation of the clear button causing the control values in the plurality of selection controls to be cleared.

30. The toolbar of claim 29, wherein the selected component object has properties that have been previously assigned to it, and further wherein an activation of the clear button causes any previously assigned properties corresponding to the control values that are cleared from the plurality of selection controls to be removed from the selected component object.

31. The toolbar of claim 26, wherein the first selection control displays a prompt requesting a user to select a menu item from the dropdown menu for the first selection control if the selected component object does not have any properties assigned to it.

32. The toolbar of claim 26, wherein the second selection control displays a prompt requesting a user to select a menu item from the dropdown menu for the second selection control upon entry of a control value into the first selection control.

33. The toolbar of claim 26, further providing a control, which when selectively activated, visually highlights the selected component object.

34. The toolbar of claim 26, wherein the toolbar further includes a control enabling a user to visually highlight all component objects in the application document that have properties assigned to them.

35. The toolbar of claim 26, wherein a dropdown menu for a control contains a menu item corresponding to a formatting context that causes a dialog corresponding to the formatting context to be invoked upon selection of said menu item, wherein the dialog that is invoked comprises user selectable formatting options.

36. The toolbar of claim 26, further including a tip box associated with each of the selection controls, each tip box displaying a content corresponding to an underlying function of its associated selection control.

37. The toolbar of claim 26, wherein additional properties are assignable to the component object by entering a secondary control value in each of said selection controls.

38. The toolbar of claim 37, wherein the first selection control dropdown menu includes indicia indicating that the component object has properties already assigned to it.

39. The toolbar of claim 37, wherein the second selection control value is cleared upon entry of a secondary control value in the first selection control if the second selection control value is not a viable option, given a context of the selected component object and the secondary control value.

40. The toolbar of claim 26, further comprising a third selection control disposed adjacent to the second selection control and having a control value and an associated dropdown menu comprising a set of menu items that are based on a context of the control value in the second selection control.

41. The toolbar of claim 40, wherein each of said selection controls is re-entrant, and the third selection control is cleared when a user changes the control value entered into the second selection control.

42. The toolbar of claim 40, wherein the set of menu items for the third selection control is updated based on a context of the changed control value of the second selection control.

43. The toolbar of claim 40, wherein each of said selection controls is re-entrant, and the second selection control and the third selection control are cleared when a user changes the control value entered into the first selection control.

44. The toolbar of claim 43, wherein the set of menu items for the second selection control is updated based on a context of a changed control value of the first selection control.

45. The toolbar of claim 40, wherein the second selection control displays a prompt requesting a user to select a menu item from the dropdown menu for the second selection control upon entry of a control value into the first selection control.

46. The toolbar of claim 40, wherein the third selection control displays a prompt requesting a user to select a menu item from the dropdown menu for the third selection control upon entry of a control value into the second selection control.

47. A computer readable medium having computer executable instructions for implementing the toolbar of claim 26.

48. A computer readable medium having computer executable instructions for implementing the toolbar of claim 40.

49. A system for enabling a user to assign properties to a selected component object in an application program document, comprising:
（a) a memory in which a plurality of machine instructions are stored;
(b) a display; and
(c) a processor that is coupled to the memory to access the machine instructions and to the display, said processor executing said machine instructions to implement a plurality of functions, said functions including:
(i) displaying a toolbar comprising a plurality of selection controls, each selection control having a control value and an associated dropdown menu comprising a set of menu items;
(ii) enabling a user to enter a control value for a first selection control by selecting a menu item from among the set of menu items comprising the dropdown menu for the first selection control, the set of menu items being based on a context of the selected component object;
(iii) enabling a user to enter a control value for a second selection control, disposed adjacent to the first selection control, by selecting a menu item from among the set of menu items comprising the dropdown menu for the second selection control, the set of menu items being based on a context of the control value in the first selection control; and
(iv) assigning properties to the selected component object based on the control values entered in the plurality of selection controls.

50. The system of claim 49, wherein said plurality of functions executed by said processor further includes enabling a user to enter a control value for a third selection control, adjacent to the second selection control, by selecting a menu item from among the set of menu items comprising the dropdown menu for the third selection control, the set of menu items being based on a context of the control value in the second selection control.

* * * * *